US012286819B2

(12) United States Patent
Kwon et al.

(10) Patent No.: US 12,286,819 B2
(45) Date of Patent: Apr. 29, 2025

(54) CONSOLE APPARATUS FOR VEHICLES (71) Applicants: Hyundai Motor Company, Seoul (KR); Kia Corporation, Seoul (KR); NIFCO KOREA INC., Asan-si (KR)

(72) Inventors: Min Woo Kwon, Seoul (KR); Jung Hoon Woo, Suwon-si (KR); Kwan Woo Lee, Suwon-si (KR); Sang Ku Hur, Hwaseong-si (KR); Byung Gi Cho, Asan-si (KR); Yang Mook Lim, Asan-si (KR)

(73) Assignees: HYUNDAI MOTOR COMPANY, Seoul (KR); KIA CORPORATION, Seoul (KR); NIFCO KOREA INC., Asan-si (KR)

( * ) Notice: Subject to any disclaimer, the term of this patent is extended or adjusted under 35 U.S.C. 154(b) by 378 days.

(21) Appl. No.: 17/828,445

(22) Filed: May 31, 2022

(65) Prior Publication Data
US 2023/0020916 A1 Jan. 19, 2023

(30) Foreign Application Priority Data

Jul. 14, 2021 (KR) .................. 10-2021-0092472

(51) Int. Cl.
*E05B 77/36* (2014.01)
*B60R 7/04* (2006.01)
*E05B 77/12* (2014.01)
*E05B 83/32* (2014.01)

(52) U.S. Cl.
CPC ............ *E05B 77/12* (2013.01); *B60R 7/04* (2013.01); *E05B 77/36* (2013.01); *E05B 83/32* (2013.01)

(58) Field of Classification Search
CPC .......... E05B 77/12; E05B 77/36; E05B 83/32; E05B 83/30; E05B 85/00; B60R 7/04; B60R 2011/0007; B60R 11/06; B60N 2/75; B60N 2/753; B60N 2/763; B60N 2/767; B60N 2/793
USPC .............................. 296/37.8, 24.34; 292/136
See application file for complete search history.

(56) References Cited

U.S. PATENT DOCUMENTS

| 5,603,540 A * | 2/1997 | Shibao | E05B 77/06 |
| | | | 292/341.15 |
| 6,761,382 B2 | 7/2004 | Ji et al. | |
| 6,802,550 B1 | 10/2004 | Griggs, Jr. et al. | |
| 6,843,528 B2 * | 1/2005 | Glynn | B60N 2/793 |
| | | | 297/411.3 |

(Continued)

FOREIGN PATENT DOCUMENTS

| JP | 4980042 B2 | 7/2012 |
| JP | 2019-077272 A | 5/2019 |

(Continued)

*Primary Examiner* — Joseph D. Pape
(74) *Attorney, Agent, or Firm* — Morgan, Lewis & Bockius LLP (57) ABSTRACT A console apparatus for vehicles, includes a locking unit is additionally provided on a console box in a structure in which a console armrest is open and closed by the frictional force of a frictional hinge unit, wherein the locking unit is not operated in a normal state in which no traffic collision occurs, and thus the console armrest is smoothly open due to the frictional force of the frictional hinge unit, and the locking unit is operated to lock the console armrest at the time of a traffic collision, and thus the console armrest remains closed even at the time of the traffic collision.

13 Claims, 10 Drawing Sheets (56) References Cited

U.S. PATENT DOCUMENTS

| | | | |
|---|---|---|---|
| 7,607,727 B2 * | 10/2009 | Park | E05B 77/04 |
| | | | 292/231 |
| 9,714,530 B2 * | 7/2017 | Amick | E05B 77/12 |
| 10,518,711 B2 * | 12/2019 | Bokulic | E05B 83/32 |
| 10,836,280 B2 | 11/2020 | Hamdoon et al. | |
| 2018/0162281 A1 | 6/2018 | Anderson et al. | |
| 2020/0408103 A1 | 12/2020 | Gaia et al. | |

FOREIGN PATENT DOCUMENTS

| | | | |
|---|---|---|---|
| KR | 20020045064 A * | 6/2002 | |
| KR | 10-2002-0062158 A | 7/2002 | |
| KR | 10-2018502 B1 | 9/2019 | |
| KR | 20020055335 * | 10/2019 | |
| KR | 10-2020-0046889 A | 5/2020 | |
| KR | 102110144 B1 * | 5/2020 | |

\* cited by examiner

CONSOLE APPARATUS FOR VEHICLES

CROSS-REFERENCE TO RELATED APPLICATION

The present application claims priority to Korean Patent Application No. 10-2021-0092472, filed on Jul. 14, 2021, the entire contents of which is incorporated herein for all purposes by this reference.

BACKGROUND OF THE INVENTION

Field of the Present Disclosure

The present disclosure relates to a console apparatus for vehicles, and more particularly, to a console apparatus for vehicles which has a frictional hinge unit and may thus prevent the opening operation of a console armrest by locking the console armrest when a traffic collision occurs.

Description of Related Art

In a general passenger vehicle, a center console is provided between a driver's seat and a front passenger seat.

A transmission lever, a cup holder, etc. are provided in the middle portion of the center console, a console box in which a space to receive articles is formed is provided at the rear portion of the center console, and a cover configured to open and close the upper portion of the console box is provided.

The cover of the console box includes a cushion material and an outer cover material, is used as an armrest configured to support the arms of a driver and a passenger sitting on the front passenger seat, and is thus referred as a console armrest.

The rear end of the console armrest is rotatably coupled to the console box via a hinge unit, and the front end of the console armrest is used as a free terminal so that the front portion of the console armrest is rotated upwards and downwards about the hinge unit provided at the rear end thereof.

A frictional hinge unit which adjusts the open angle of the console armrest using frictional force may be used as the hinge unit of the console armrest.

The frictional hinge unit of the console armrest includes a shaft and a friction member configured to come into contact with the shaft to generate frictional force, and fixes the console armrest using the frictional force generated due to contact between the shaft and the friction member during rotation of the shaft, thereby variously adjusting the open angle of the console armrest to an angle desired by a user.

Furthermore, in the console apparatus provided with the frictional hinge unit, the console armrest is fixed to a desired position by the frictional force, and thus a locking unit provided with a knob is not required.

However, in the conventional console apparatus provided with the frictional hinge unit, a separate locking unit is not provided and thus the console armrest may be rotated to be open by itself due to inertial force when a traffic collision occurs, and thereby, articles in the console box may be released to the outside or the open console armrest may increase the risk of passenger injuries.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present disclosure are directed to providing a console apparatus for vehicles which locks a console armrest using a locking unit, operated by inertial force when a traffic collision occurs, and thus prevents opening of the console armrest in a structure in which the console armrest is open and closed due to the frictional force of a frictional hinge unit, to maintain convenience in use through the opening operation of the console armrest due to the frictional force in a normal state in which no traffic collision occurs, and to prevent release of articles from the inside of a console box and passenger injuries due to the console armrest by preventing the opening operation of the console armrest due to the locking unit when a traffic collision occurs.

In accordance with the present disclosure, the above and other objects may be accomplished by the provision of a console apparatus for vehicles, including a console box provided with a space formed therein to receive articles, a console armrest provided with one end rotatably coupled to the console box a via a frictional hinge unit to open and close the console box, and a locking unit fixedly combined with a side of the console box opposite the frictional hinge unit and operated by inertia occurring at a time of a traffic collision to lock the console armrest to prevent opening of the console armrest.

The locking unit may not be operated and thus not lock the console armrest in a state in which no traffic collision occurs.

The locking unit may be combined with the console box to be located on a front surface of the console box, and may be operated to lock the console armrest at the time of the traffic collision.

The locking unit may include a housing fixedly combined with a front surface of the console box, a rotation lever rotatably coupled to the housing via a lever pin, and a slider rotatably coupled to an upper end of the rotation lever above the lever pin via a connection pin, the rotation lever may be rotated about the lever pin by the inertia occurring at the time of the traffic collision, and the slider may be rectilinearly moved to pass through the housing and then to be inserted into a locking hole of the console armrest to lock the console armrest when the rotation lever is rotated.

The locking unit may further include a mass combined with a lower end of the rotation lever at a side of the lever pin and configured to generate rotational inertia of the rotation lever to rotate the rotation lever about the lever pin.

The rotation lever configured so that the mass is combined therewith may be rotated in a direction of pushing the slider about the lever pin due to the inertia occurring at the time of the traffic collision.

The locking unit may further include a lever spring provided with one end coupled to the housing and a remaining end coupled to the rotation lever, and configured to provide a force to the rotation lever to rotate the rotation lever downwards in a direction of pulling the slider about the lever pin.

The locking unit may further include a damper fixedly provided on the housing and configured to prevent noise occurrence through contact with the rotation lever when the rotation lever receives rotating force due to the spring force of the lever spring.

A pin hole formed through an upper end of the rotation lever so that the connection pin passes through the pin hole may be formed as an oval-shaped slot hole to absorb an operating deviation between the rotation lever and the slider.

An inclined protrusion may be formed at one side of the slider to protrude outwards, an inclined portion may be formed at a position of an inner surface of the console armrest opposite the inclined protrusion, and when the slider passes through the locking hole and is moved to protrude towards inside of the console armrest, the inclined protrusion and the inclined portion may come into contact with each other and thus guide movement of the slider.

An engaged portion may be formed at a front end of the slider to protrude in an opposite direction to the inclined protrusion, and when the engaged portion passes through the locking hole and is then engaged with the console armrest to be fixed thereto, a locked state of the console armrest by the slider may be maintained.

When the engaged portion engaged with the console armrest after passing through the locking hole is pushed in a direction toward the inclined protrusion, engagement of the engaged portion with the console armrest may be released, and accordingly, the locked state of the console armrest by the slider may be released.

The hinge unit may be a frictional hinge unit configured to adjust an open angle of the console armrest using frictional force.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE EXEMPLARY EMBODIMENTS

Reference will now be made in detail to various embodiments of the present disclosure(s), examples of which are illustrated in the accompanying drawings and described below. While the invention(s) will be described in conjunction with exemplary embodiments of the present disclosure, it will be understood that the present description is not intended to limit the invention(s) to those exemplary embodiments of the present disclosure. On the other hand, the invention(s) is/are intended to cover not only the exemplary embodiments of the present disclosure, but also various alternatives, modifications, equivalents and other embodiments, which may be included within the spirit and scope of the invention as defined by the appended claims.

Specific structural or functional descriptions in embodiments of the present disclosure set forth in the description which follows will be exemplarily provided to describe the exemplary embodiments of the present disclosure. However, the present disclosure may be embodied in many alternative forms, and should not be construed as being limited to the exemplary embodiments set forth herein.

The exemplary embodiments of the present disclosure may be variously modified and changed, and thus specific embodiments of the present disclosure will be illustrated in the drawings and described in detail in the following description of the exemplary embodiments of the present disclosure. However, it will be understood that the exemplary embodiments of the present disclosure are provided only to completely disclose the invention and cover modifications, equivalents or alternatives which come within the scope and technical range of the invention.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those in the skill in the art. Terms defined in generally used dictionaries will be interpreted as having meanings coinciding with contextual meanings in the related technology, and are not to be interpreted as having ideal or excessively formal meanings unless defined clearly in the description.

A control unit (controller) according to various exemplary embodiments of the present disclosure may be implemented through a non-volatile memory configured to store an algorithm configured to control operations of various elements of the vehicle or data regarding software commands for reproducing the algorithm and a processor configured to perform operations which will be described below using data stored in the corresponding memory. The memory and the processor may be implemented as individual chips. Alternatively, the memory and the processor may be implemented as a single integrated chip. Here, the processor may be provided in the form of one or more processors.

Hereinafter, a console apparatus for vehicles according to various exemplary embodiments of the present disclosure will be described with reference to the accompanying drawings.

A console apparatus for vehicles according to an exemplary embodiment of the present disclosure includes, as shown in FIGS. 1 to 10, a console box 100 provided with a space formed therein to receive articles, a console armrest 300 provided with one end rotatably coupled to the console box 100 via a frictional hinge unit 200 to open and close the console box 100, and a locking unit 400 fixedly combined with a side of the console box 100 opposite the frictional hinge unit 200 and operated by inertia occurring at the time of a traffic collision to lock the console armrest 300 to prevent opening of the console armrest 300.

The console apparatus according to an exemplary embodiment of the present disclosure may be used as a center console provided between a driver's seat and a front passenger seat.

The console armrest 300 includes a cushion material and an outer cover material, and serves to support the arms of a driver and a passenger sitting on the front passenger seat.

The rear end of the console armrest 300 is rotatably coupled to the rear portion of the console box 100 via the frictional hinge unit 200, and the front end of the console armrest 300 is used as a free terminal so that the front portion of the console armrest 300 is rotated upwards and downwards about the frictional hinge unit 200 provided at the rear portion thereof.

The frictional hinge unit 200 configured to assist for rotation of the console armrest 300 includes a lower bracket combined with the console box 100, an upper bracket combined with the console armrest 300, a shaft configured to pass through the lower bracket and the upper bracket, and a friction member configured to generate frictional force due to be in contact with the shaft when the shaft is rotated.

The open angle of the console armrest 300 may be variously adjusted by the frictional force generated due to contact between the shaft and the friction member when the console armrest 300 is rotated, and the position of the console armrest 300 in the open state thereof may be fixed by the frictional force.

In the above-described conventional console apparatus provided with the frictional hinge unit 200, a separate locking unit is not provided and thus the console armrest is rotated to be open by itself due to inertial force when a traffic collision occurs, and thereby, articles in the console box may be released to the outside or the open console armrest may cause passenger injuries.

To solve the above problems, the console apparatus according to one exemplary embodiment of the present disclosure further includes the locking unit 400 in addition to the frictional hinge unit 200.

In a normal state in which no traffic collision occurs, the locking unit 400 is not operated and thus does not lock the console armrest 300, and the console armrest 300 smoothly performs the opening operation thereof due to the frictional force of the frictional hinge unit 200, thereby maintaining convenience in use.

On the other hand, when a traffic collision occurs, the locking unit 400 according to an exemplary embodiment of the present disclosure is operated by inertia occurring at the time of the traffic collision to lock the console armrest 300, and thus, the console armrest 300 is not open, and accordingly, the console armrest 300 remains closed even at the time of the traffic collision to prevent release of articles from the inside of the console box 100 and passenger injuries due to the console armrest 300.

For the present purpose, the locking unit 400 according to an exemplary embodiment of the present disclosure includes a housing 410 fixedly combined with the front surface of the console box 100, a rotation lever 430 rotatably coupled to the housing 410 via a lever pin 420, and a slider 450 rotatably coupled to the upper end of the rotation lever 430 above the lever pin 420 via a connection pin 440.

The rotation lever 430 is rotated about the lever pin 420 by inertia occurring at the time of the traffic collision, and the slider 450 is rectilinearly moved to pass through the housing 410 and then to be inserted into a locking hole 310 of the console armrest 300 to lock the console armrest 300 when the rotation lever 430 is rotated.

Furthermore, the locking unit 400 according to an exemplary embodiment of the present disclosure further includes a mass 460 combined with the lower end of the rotation lever 430 at the side of the lever pin 420 and configured to generate the rotational inertia of the rotation lever 430 to rotate the rotation lever 430 about the lever pin 420.

Figure 7:
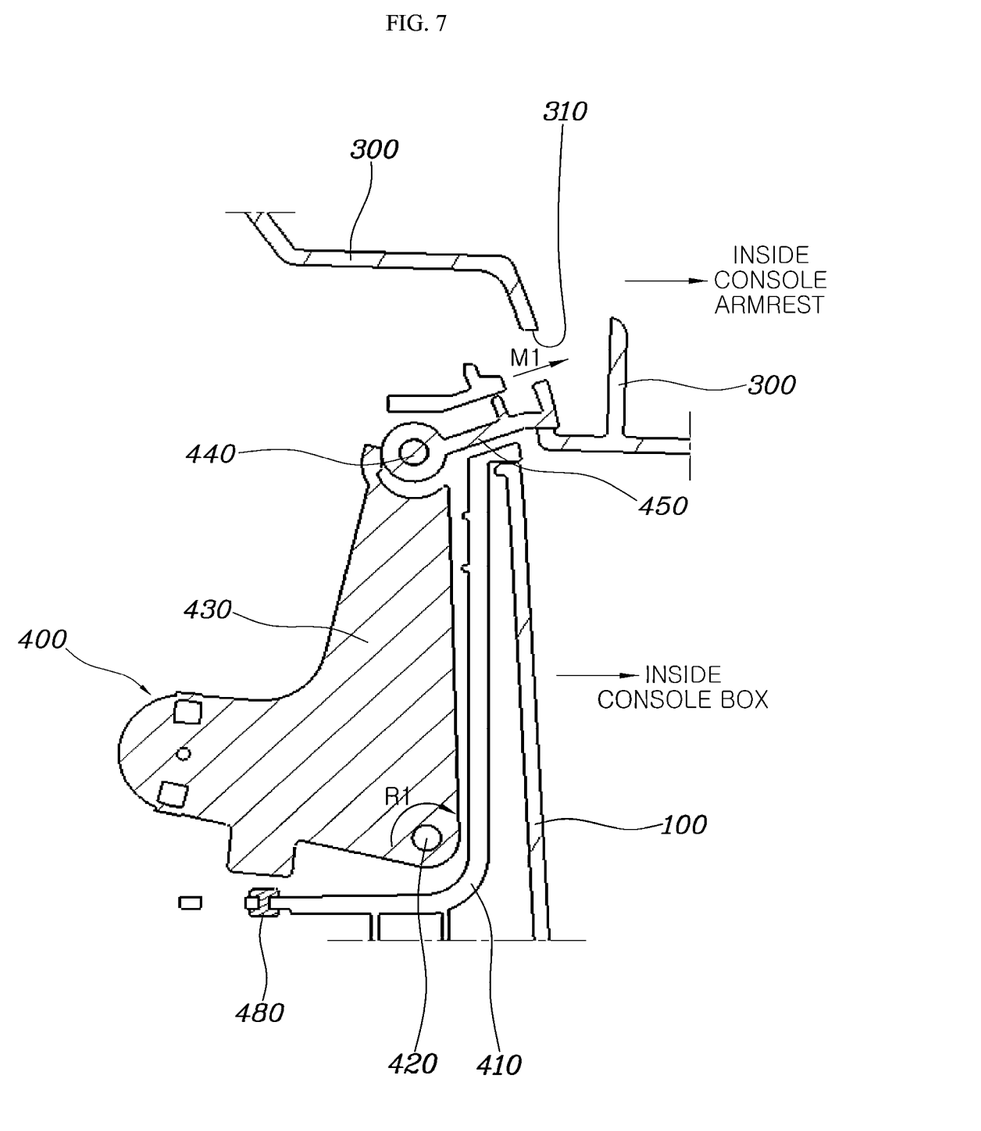
FIG. 7 is a cross-sectional view illustrating a state in which the console armrest is locked by the slider due to occurrence of a traffic collision in the state shown in FIG. 6.

The rotation lever 430, with which the mass 460 is combined, is rotated in a direction of pushing the slider 450, i.e., the clockwise direction, about the lever pin 420, as shown in FIG. 7, due to inertia occurring at the time of the traffic collision, and the slider 450 is rectilinearly moved rightwards, as shown by arrow M1, by a rotation of the rotation lever 430 in the clockwise direction, passes through the housing 410, and is inserted into the locking hole 310 of the console armrest 300 to lock the console armrest 300.

Furthermore, the locking unit 400 according to the preset invention further includes a lever spring 470 provided with one end coupled to the housing 410 and the other end combined with the rotation lever 430 in the state in which the lever pin 420 passes through the center portion of the lever spring 470, and configured to provide a force to the rotation lever 430 to rotate the rotation lever 430 in a direction of pulling the slider 450 about the lever pin 420, i.e., downwards.

Figure 6:
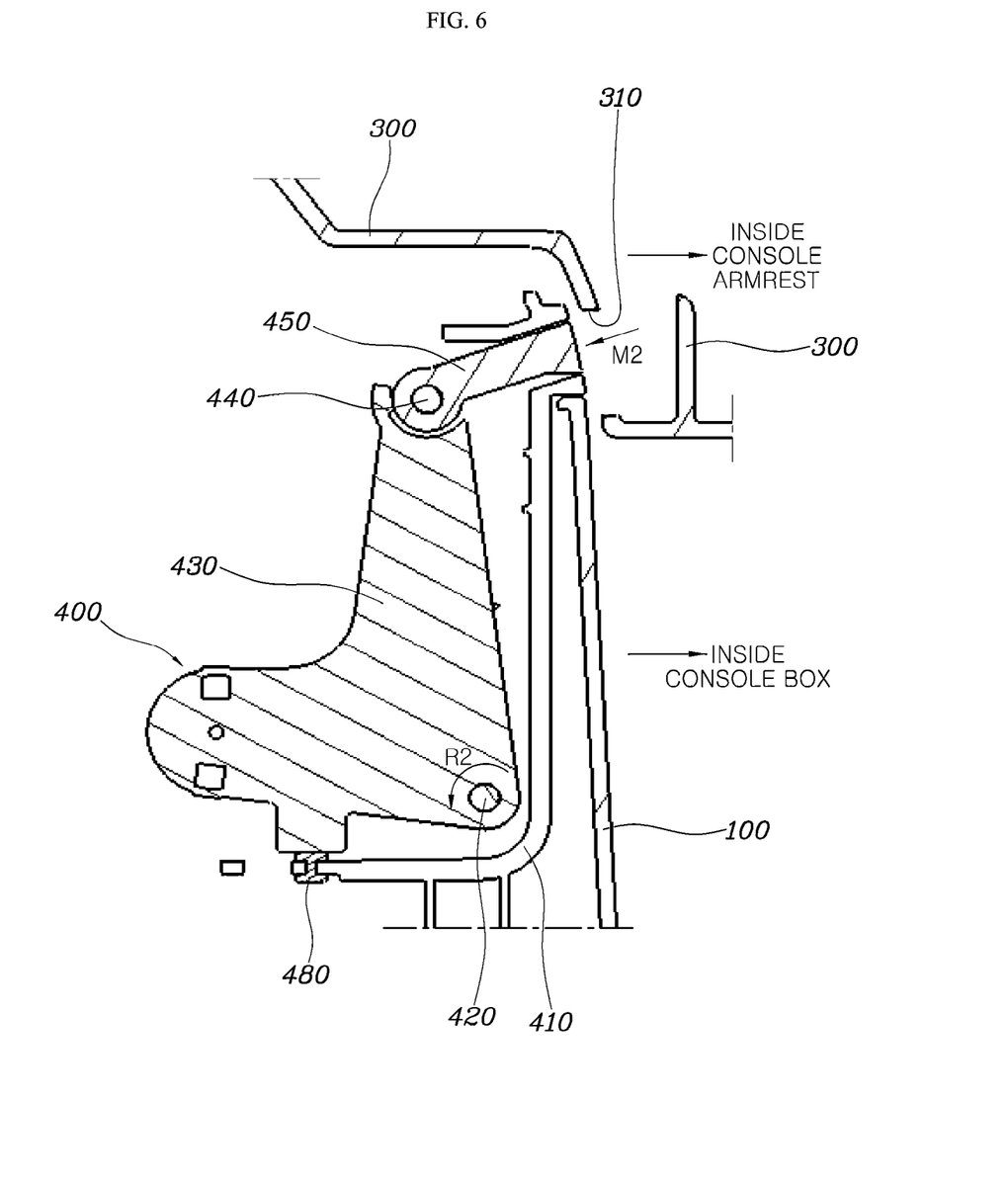
FIG. 6 is a cross-sectional view of FIG. 2 taken along line I-I, illustrating a state in which a console armrest is not locked by a slider before occurrence of a traffic collision.

The rotation lever 430 receives rotating force in the counterclockwise direction about the lever pin 420, as shown in FIG. 6, due to the spring force of the lever spring 470, the slider 450 is pulled and moved leftwards, as shown by arrow M2, by a rotation of the rotation lever 430 in the counterclockwise direction, and is separated from the locking hole 310 of the console armrest 300, and accordingly, locking of the console armrest 300 by the slider 450 is released.

In the normal state in which no traffic collision occurs, the slider 450 remains separate from the locking hole 310 of the console armrest 300, and thus, release of locking of the console armrest 300 by the slider 450 is maintained.

Furthermore, the locking unit 400 according to an exemplary embodiment of the present disclosure further includes a damper 480 fixedly provided on the housing 410 and configured to prevent noise occurrence through contact with the rotation lever 430 when the rotation lever 430 receives rotating force due to the spring force of the lever spring 470.

The damper 480 may be formed of rubber, may be fixedly provided on the bottom surface of the housing 410, and may prevent direct contact between the housing 410 and the rotation lever 430 and thus serve to absorb shock and to prevent noise occurrence when the rotation lever 430 receives rotating force in the counterclockwise direction, as shown by arrow R2, due to the spring force of the lever spring 470.

Figure 1:
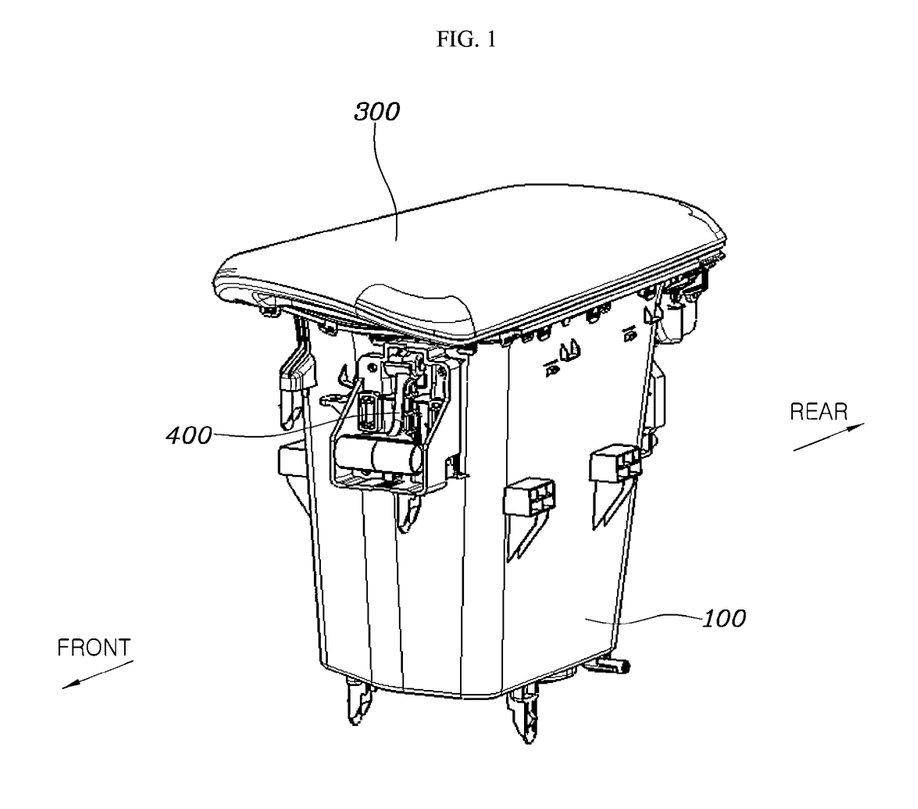
FIG. 1 is a perspective view of a console apparatus for vehicles according to an exemplary embodiment of the present disclosure.
Figure 2:
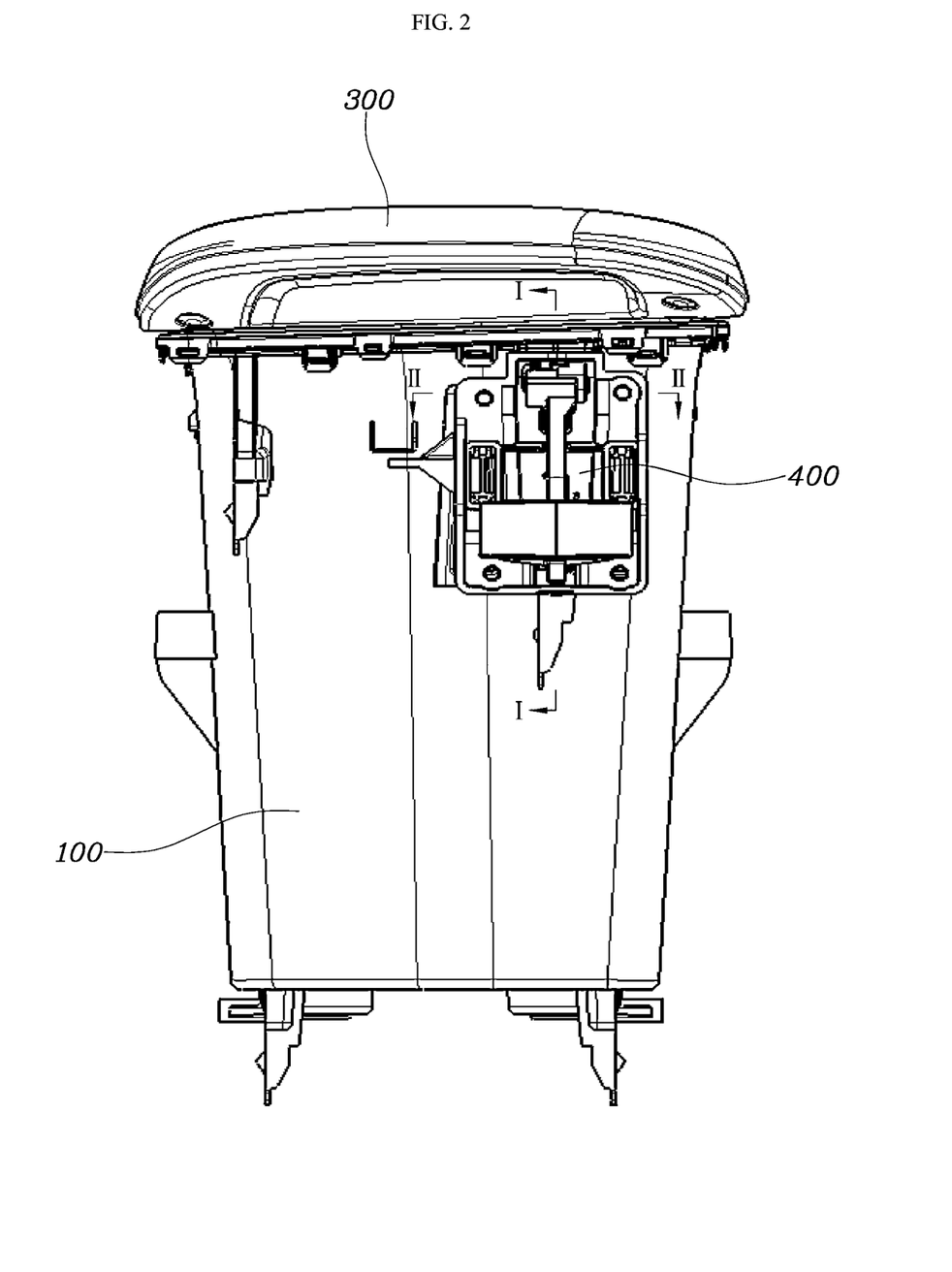
FIG. 2 is a front view of FIG. 1.
Figure 3:
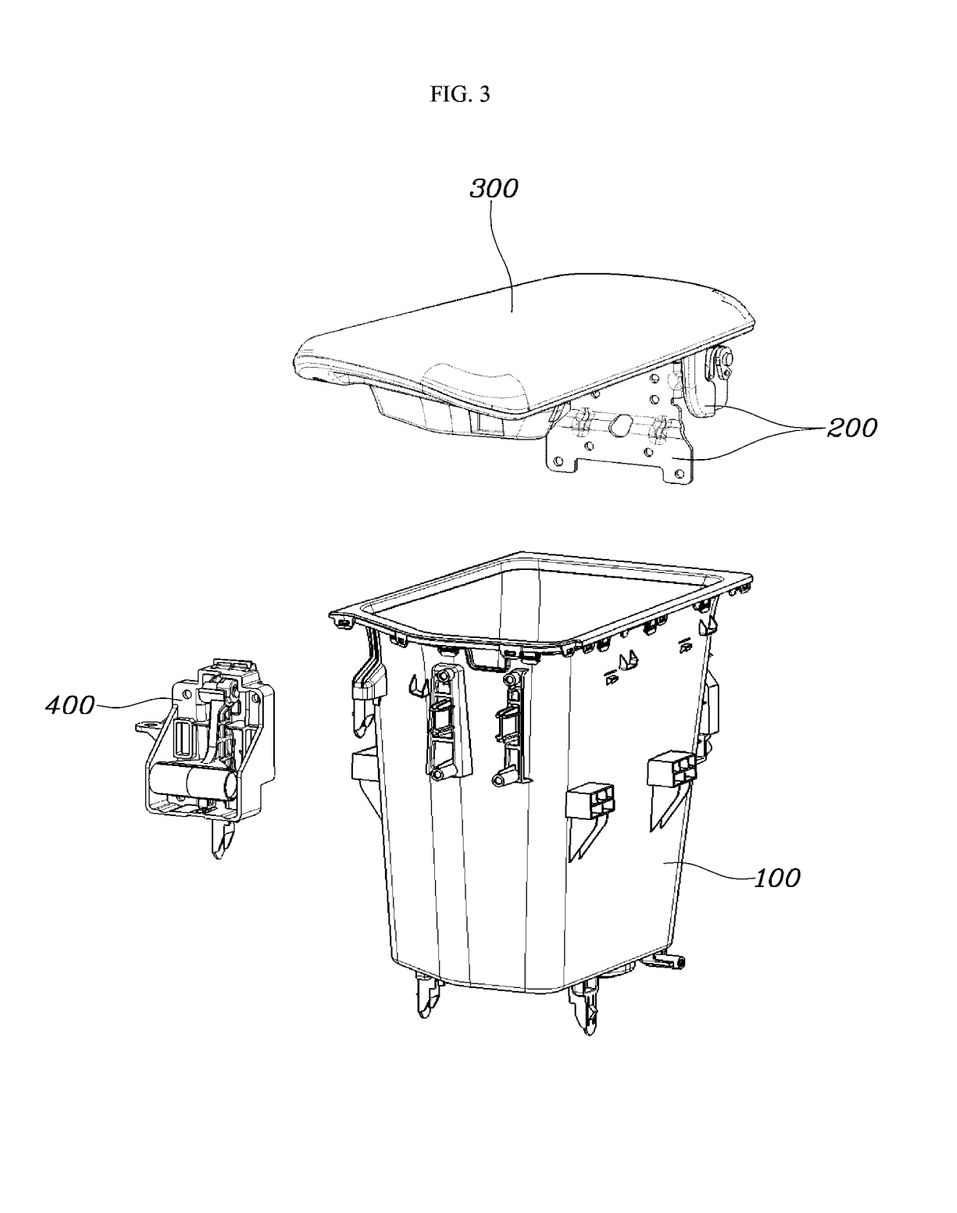
FIG. 3 is an exploded perspective view of FIG. 1.
Figure 4:
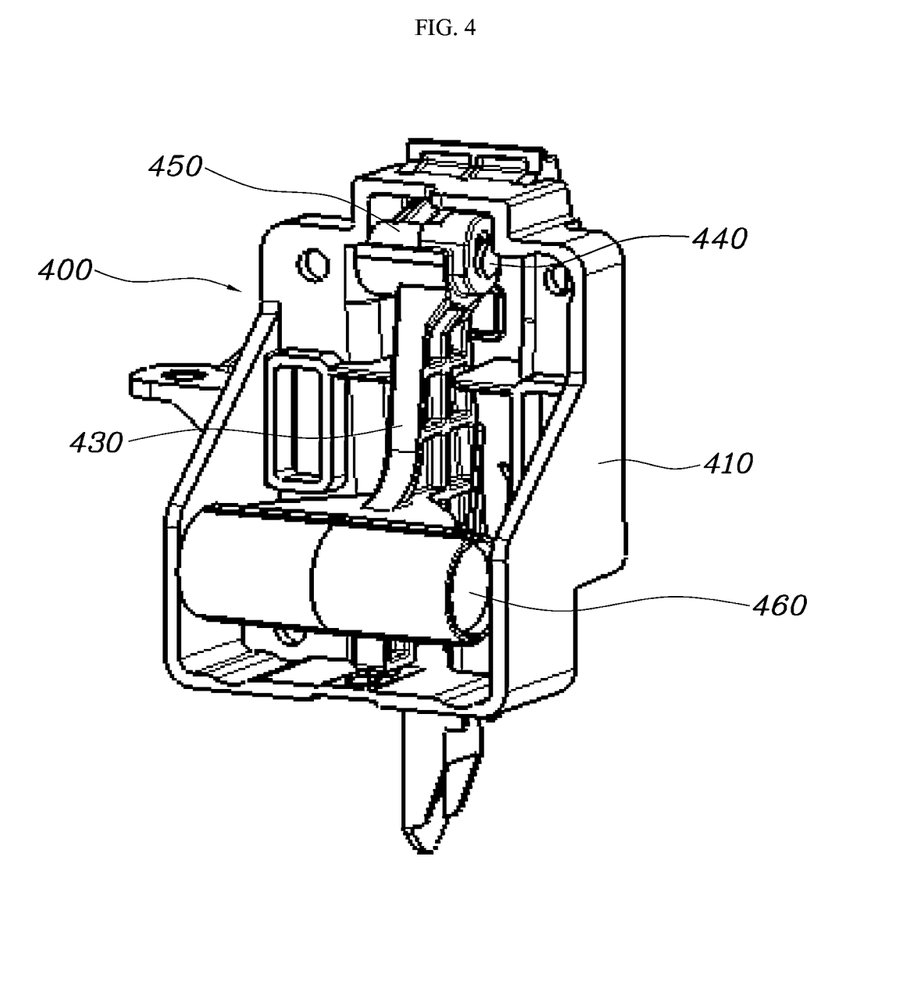
FIG. 4 is a perspective view of a locking unit according to an exemplary embodiment of the present disclosure.
Figure 5:
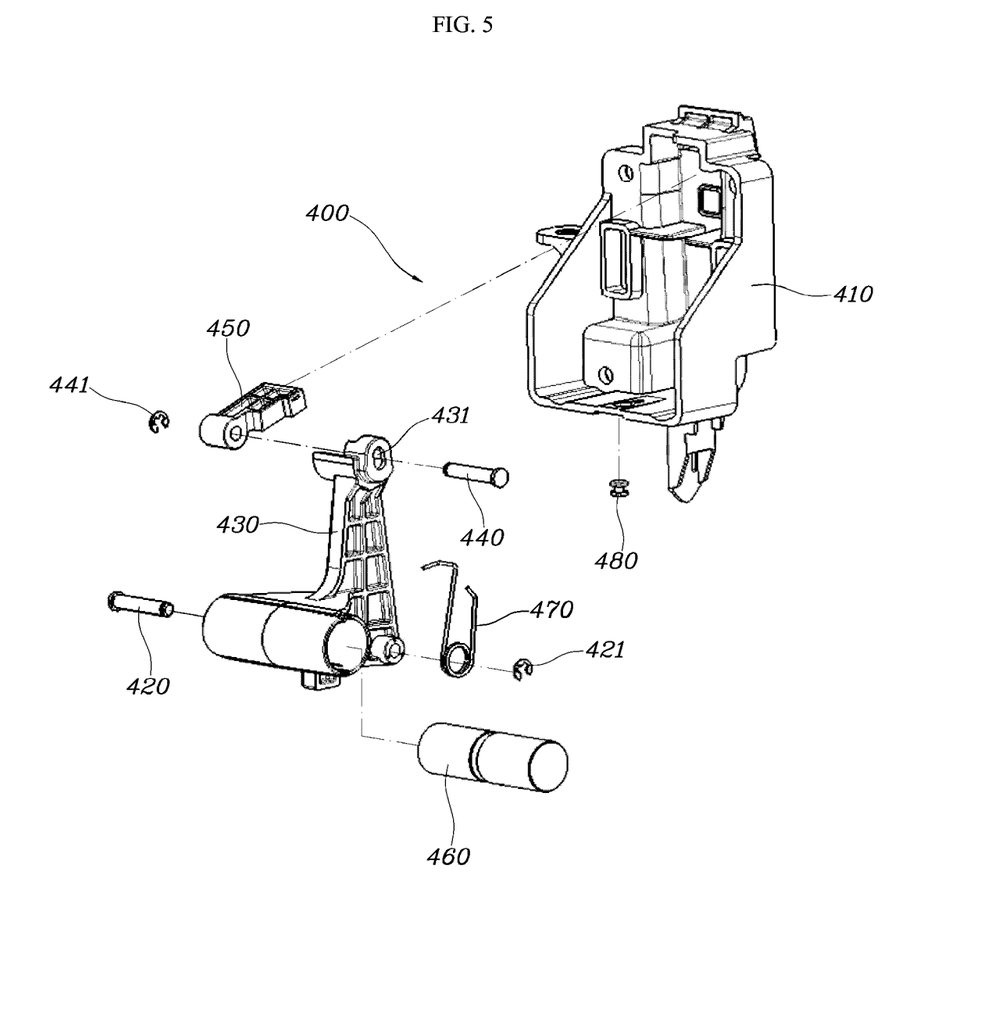
FIG. 5 is an exploded perspective view of FIG. 4.

In FIG. 5, undescribed reference numerals 421 and 441 are clip members which are respectively combined with the end of the lever pin 420 and the end of the connection pin 440, and release of the lever pin 420 and the connection pin 440 is prevented by combining the clip members 421 and 441 therewith.

In one exemplary embodiment of the present disclosure, a pin hole 431 formed through the upper end of the rotation lever 450 so that the connection pin 440 passes through the pin hole 431 may be formed as an oval-shaped slot hole to absorb an operating deviation between the rotation lever 430 and the slider 450.

If the pin hole 431 is formed to have a perfectly circular shape, a hole formed through one end of the slider 450 so that the connection pin 440 passes through the hole may be formed as an oval-shaped slot hole.

Figure 8:
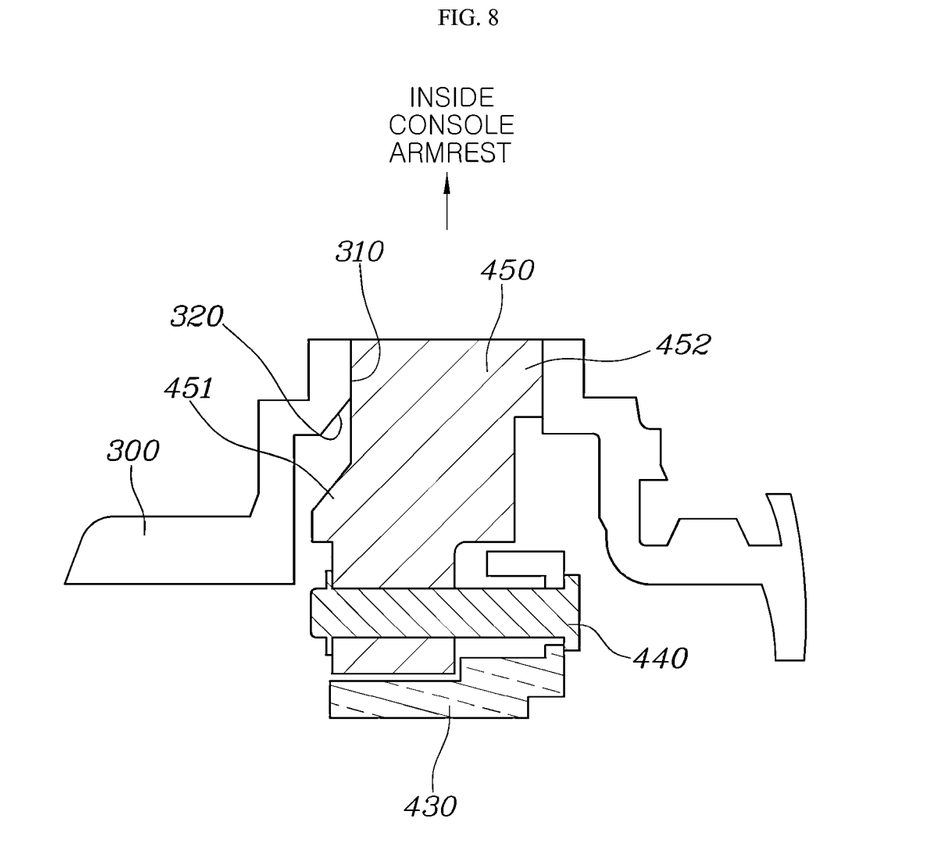
FIG. 8 is a cross-sectional view of FIG. 2 taken along line II-II, illustrating the state in which the console armrest is not locked by the slider before occurrence of a traffic collision.
Figure 9:
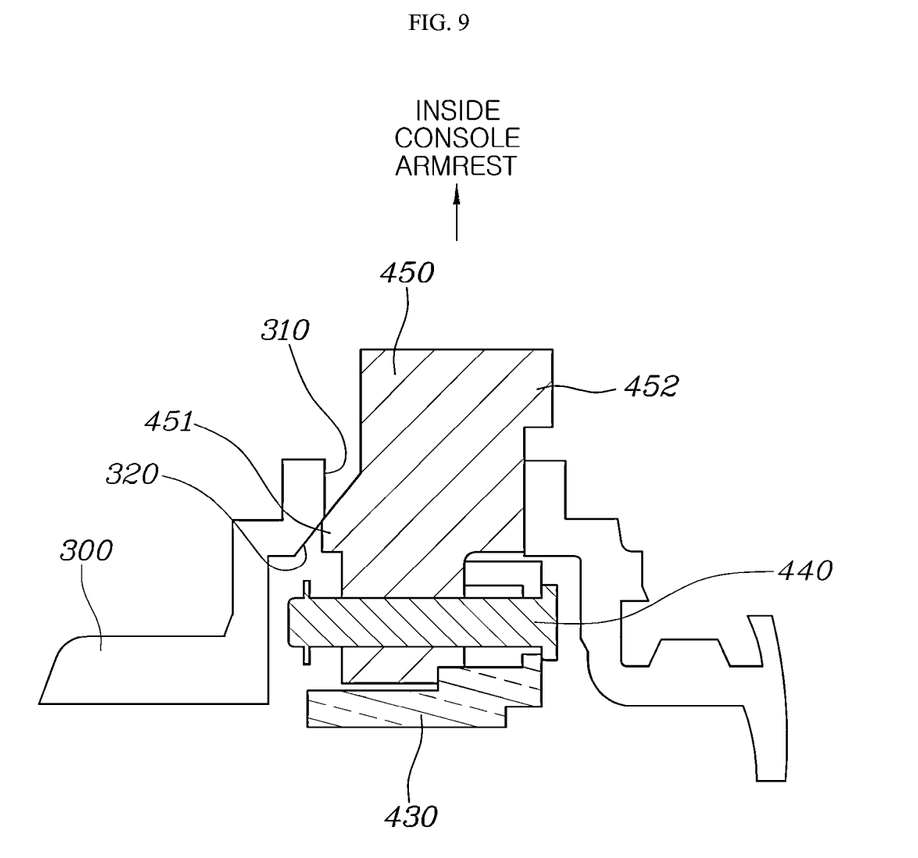
FIG. 9 is a cross-sectional view illustrating a state in which the slider is moved to pass through a locking hole of the console armrest when a collision occident occurs.

As shown in FIG. 8 and FIG. 9, an inclined protrusion 451 is formed at one side of the slider 450 according to an exemplary embodiment of the present disclosure to protrude outwards, and an inclined portion 320 is formed at the position of the inner surface of the console armrest 300 opposite the inclined protrusion 451.

The rotation lever 430 is rotated about the lever pin 420 due to inertia occurring at the time of the traffic collision, and when the slider 450 passes through the locking hole 310 of the console armrest 300 due to rotation of the rotation lever 430 and is moved to protrude toward the inside of the console armrest 300, the inclined protrusion 451 and the inclined portion 320 come into contact with each other and thus serve to guide movement of the slider 450.

Figure 10:
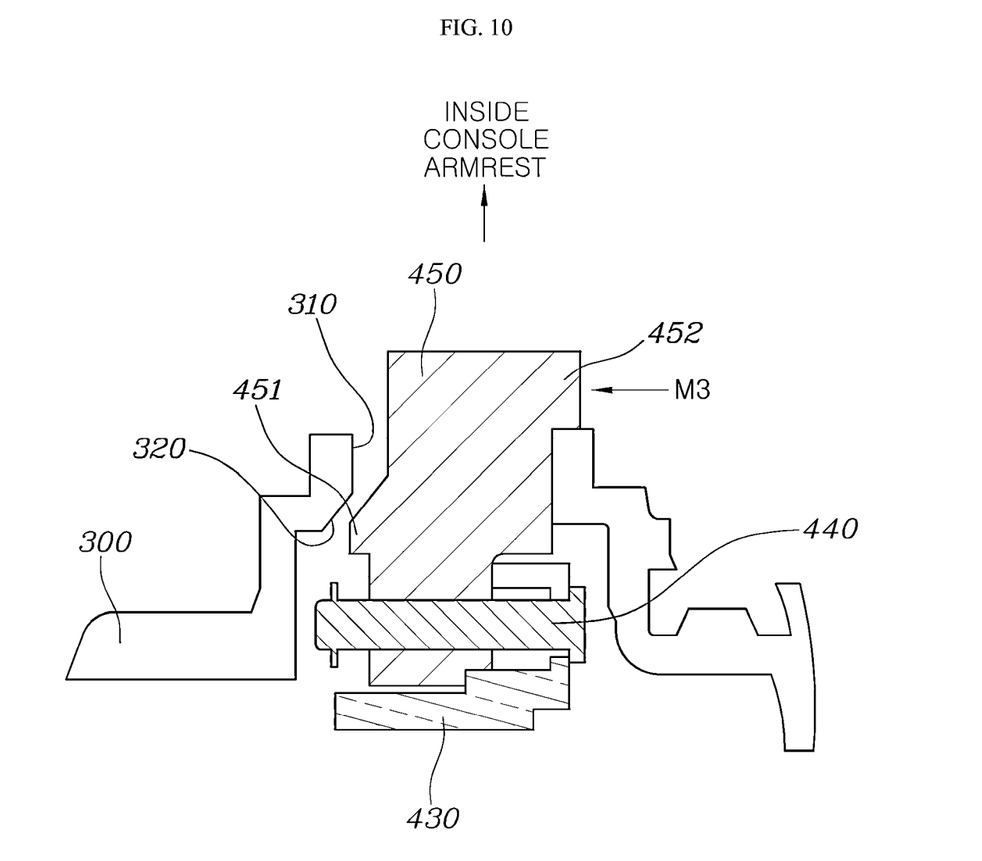
FIG. 10 is a cross-sectional view illustrating a state in which an engaged portion is fixedly engaged with the console armrest after the slider passes through the locking hole of the console armrest in the state shown in FIG. 9.

Furthermore, as shown in FIG. 10, an engaged portion 452 is formed at the front end of the slider 450 to protrude in the opposite direction to the inclined protrusion 451, and when the engaged portion 452 passes through the locking hole 310 and is then engaged with the console armrest 300 to be fixed thereto, the locked state of the console armrest 300 by the slider 450 is maintained.

Furthermore, when the engaged portion 452 engaged with the console armrest 300 after passing through the locking hole 310 is pushed in a direction toward the inclined protrusion 451, i.e., in a direction of arrow M3, engagement of the engaged portion 452 with the console armrest 300 is released, and accordingly, the locked state of the console armrest 300 by the slider 450 is released, and thus the console armrest 300 is returned to the state thereof prior to the traffic collision.

As described above, in the console apparatus for vehicles according to an exemplary embodiment of the present disclosure, in which the locking unit 400 is additionally provided on the console box 100 in the structure in which the console armrest 300 is open and closed by the frictional force of the frictional hinge unit 200, the locking unit 400 is not operated in the normal state in which no traffic collision occurs, and thus the console armrest 300 is not locked by the locking unit 400 and is smoothly open due to the frictional force of the frictional hinge unit 200, thereby being capable of maintaining convenience in use.

Furthermore, in the console apparatus for vehicles according to an exemplary embodiment of the present disclosure, the locking unit 400 is operated to lock the console armrest 300 due to inertia occurring at the time of a traffic collision, and thus prevents opening operation of the console armrest 300, and therefore, the console armrest 300 remains closed even at the time of the traffic collision, thereby being capable of preventing release of articles from the inside of the console box 100 and passenger injuries due to the console armrest 300.

As is apparent from the above description, in a console apparatus for vehicles according to an exemplary embodiment of the present disclosure, in which a locking unit is additionally provided on a console box using a structure in which a console armrest is open and closed by the frictional force of a frictional hinge unit, the locking unit is not operated in a normal state in which no traffic collision occurs, and thus the console armrest is not locked by the locking unit and is smoothly open due to the frictional force of the frictional hinge unit, thereby being capable of maintaining convenience in use.

Furthermore, in the console apparatus for vehicles according to an exemplary embodiment of the present disclosure, the locking unit is operated to lock the console armrest due to inertia occurring at the time of a traffic collision, and thus prevents opening operation of the console armrest, and therefore, the console armrest remains closed even at the time of the traffic collision, thereby being capable of preventing release of articles from the inside of the console box and passenger injuries due to the console armrest.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present disclosure, as well as various alternatives and modifications thereof. It is intended that the scope of the invention be defined by the Claims appended hereto and their equivalents.

What is claimed is:

1. A console apparatus for vehicles, the console apparatus comprising:
   a console box provided with a space formed therein to receive articles;
   a console armrest provided with one end rotatably coupled to the console box via a frictional hinge unit to open and close the console box; and
   a locking unit fixedly combined with a side of the console box opposite the frictional hinge unit and operated by inertia occurring at a time of a traffic collision to lock the console armrest to prevent opening of the console armrest,
   wherein the locking unit includes:
      a housing fixedly combined with a front surface of the console box:
      a rotation lever rotatably coupled to the housing via a lever pin; and
      a slider rotatably coupled to an upper end of the rotation lever above the lever pin via a connection pin,
   wherein the rotation lever is rotated about the lever pin by the inertia occurring at the time of the traffic collision, and
   wherein the slider is rectilinearly moved to pass through the housing and then to be inserted into a locking hole of the console armrest to lock the console armrest when the rotation lever is rotated.

2. The console apparatus of claim 1, wherein the locking unit is not operated and thus does not lock the console armrest in a state in which no traffic collision occurs.

3. The console apparatus of claim 1, wherein the locking unit is combined with the console box to be located on a front surface of the console box, and is operated to lock the console armrest at the time of the traffic collision.

4. The console apparatus of claim 1, wherein the locking unit further includes a mass combined with a lower end of the rotation lever at a side of the lever pin and configured to generate rotational inertia of the rotation lever to rotate the rotation lever about the lever pin.

5. The console apparatus of claim 4, wherein the rotation lever configured so that the mass is combined therewith is rotated in a direction of pushing the slider about the lever pin due to the inertia occurring at the time of the traffic collision.

6. The console apparatus of claim 1, wherein the locking unit further includes a lever spring provided with one end coupled to the housing and a remaining end coupled to the rotation lever, and configured to provide a force to the rotation lever to rotate the rotation lever downwards in a direction of pulling the slider about the lever pin.

7. The console apparatus of claim 6, wherein the locking unit further includes a damper fixedly provided on the housing and configured to prevent noise occurrence through contact with the rotation lever when the rotation lever receives rotating force due to the force of the lever spring.

8. The console apparatus of claim 1, wherein a pin hole formed through an upper end of the rotation lever so that the connection pin passes through the pin hole is formed as an oval-shaped slot hole to absorb an operating deviation between the rotation lever and the slider.

9. The console apparatus of claim 1, wherein a hole formed through one end of the slider so that the connection pin passes through the hole is formed as an oval-shaped slot hole.

10. The console apparatus of claim 1
    wherein the slider includes an inclined protrusion formed at a side of the slider to protrude outwards;
    wherein the console armrest includes an inclined portion formed at a position of an inner surface of the console armrest opposite the inclined protrusion of the slider,
    wherein when the slider passes through the locking hole and is moved to protrude towards inside of the console armrest, the inclined protrusion and the inclined portion come into contact with each other and thus guide movement of the slider.

11. The console apparatus of claim 10,
    wherein the slider further includes an engaged portion formed at a front end of the slider to protrude in an opposite direction to the inclined protrusion,
    wherein, when the engaged portion passes through the locking hole and is then engaged with the console armrest to be fixed thereto, a locked state of the console armrest by the slider is maintained.

12. The console apparatus of claim 11, wherein, when the engaged portion engaged with the console armrest after passing through the locking hole is pushed in a direction toward the inclined protrusion, engagement of the engaged portion with the console armrest is released, and accordingly, the locked state of the console armrest by the slider is released.

13. The console apparatus of claim 1, wherein the frictional hinge unit is configured to adjust an open angle of the console armrest using frictional force.

* * * * *